US 6,578,650 B2

(12) United States Patent
Ozawa et al.

(10) Patent No.: US 6,578,650 B2
(45) Date of Patent: Jun. 17, 2003

(54) FRONT END PANEL (75) Inventors: Ikuo Ozawa, Toyoake (JP); Norihisa Sasano, Ama-gun (JP); Toshiki Sugiyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/883,594

(22) Filed: Jun. 19, 2001

(65) Prior Publication Data

US 2001/0045310 A1 Nov. 29, 2001

Related U.S. Application Data (63) Continuation of application No. PCT/JP00/07354, filed on Oct. 20, 2000.

(30) Foreign Application Priority Data

Oct. 20, 1999 (JP) ............................................ 11-298495
Nov. 11, 1999 (JP) ............................................ 11-321630

(51) Int. Cl.[7] ............................................ B60K 11/00
(52) U.S. Cl. ..................... 180/68.1; 180/68.4; 180/69.2
(58) Field of Search .............................. 180/68.1, 68.2, 180/68.3, 68.4, 69.2, 69.22, 69.23, 68.6; 123/41.01

(56) References Cited

U.S. PATENT DOCUMENTS

| 4,071,009 A | * | 1/1978 | Kraina ........................ 180/68.1 |
| 4,164,262 A | * | 8/1979 | Skatsche et al. ............ 180/68.1 |
| 4,443,236 A | * | 4/1984 | Peiler ......................... 180/68.6 |
| 4,610,326 A | * | 9/1986 | Kirchweger et al. ....... 180/68.1 |
| 4,706,615 A | * | 11/1987 | Scadding ................. 123/41.01 |
| 4,984,350 A | * | 1/1991 | Hayashi ..................... 180/68.3 |
| 5,660,243 A | * | 8/1997 | Anzalone et al. .......... 180/68.1 |
| 6,035,955 A | * | 3/2000 | Suzuki et al. .............. 180/68.1 |
| 6,302,228 B1 | * | 10/2001 | Cottereau et al. .......... 180/68.1 |

FOREIGN PATENT DOCUMENTS

| JP | U-56-65132 | 6/1981 |
| JP | U-4-134663 | 12/1992 |
| JP | A-10-32974 | 12/1998 |
| JP | A-10-329754 | 12/1998 |
| JP | A-11-115806 | 4/1999 |
| JP | A-11-171041 | 6/1999 |
| JP | 2000-142470 | 5/2000 |

* cited by examiner

Primary Examiner—Frank Vanaman
Assistant Examiner—Hau Phan
(74) Attorney, Agent, or Firm—Harness, Dickey & Pierce, PLC (57) ABSTRACT An intake duct (intake air path) utilizes an upper beam member of a front end panel, the cross section of which is substantially a C-shape. When the front end panel is assembled into a vehicle with the duct member being attached to the front end panel, assembling of the intake duct is completed. In another embodiment, a space (intake duct) is formed in a first pillar section of the front end panel with an intake port and a discharge port, which communicate the inside of the space with the outside of the space; the parts are arranged such that they are shifted from each other when they are viewed from the front side of the vehicle. Thus, a current of air flowing into the space flows in a crank-shape and passes outside of the space. Accordingly, foreign objects such as rain water and snow, which have entered the space together with air, will not flow together with the current of air flowing in the space. Therefore, the foreign objects such as rain water and snow remain in the space.

13 Claims, 7 Drawing Sheets

FRONT END PANEL

CROSS-REFERENCE TO RELATED APPLICATIONS

This application is based upon and claims the priority of Japanese Patent Application No. 11-298495, filed Oct. 20, 1999 and No. 11-321630, filed Nov. 11, 1999, the contents being incorporated therein by reference, and is a continuation of PCT/JP00/07354, filed Oct. 20, 2000.

1. Technical Field

The present invention relates to a structure of an intake duct for guiding air into a vehicle engine. More particularly, the present invention relates to a front end panel having an intake duct structure which is incorporated into a front end section of a vehicle and into which vehicle front end parts including at least a radiator are incorporated.

2. Background Art

In general, an intake duct is composed in such a manner that a plurality of pipe-shaped ducts made of resin are connected with each other.

However, the above means has the following disadvantages. In order to assemble the intake duct in the case of assembling a vehicle, it is necessary to incorporate a plurality of ducts into the vehicle. Therefore, it is difficult to reduce the time of assembly. Accordingly, it is difficult to decrease the manufacturing cost of the vehicle.

For example, according to the invention disclosed in Japanese Unexamined Patent Publication No. 10-329754, an air filter for preventing foreign objects such as rain water and snow from air from being sucked into an engine and an air cleaner box for accommodating the air filter are integrally arranged on a front end panel, so that a space in an engine compartment can be effectively utilized.

However, at least a radiator is incorporated onto the front end panel. Therefore, it is necessary to provide a relatively large space for the radiator on the front end panel. Accordingly, it is difficult to incorporate an air cleaner box, the volume of which is sufficient to accommodate the air filter, onto the front end panel.

For the above reasons, if the air cleaner box, the volume of which is sufficient to accommodate the air filter, is arranged in an air path formed on the front end panel, the size of the front end panel is increased. Therefore, the front end panel, the structure of which is the same as that disclosed in the above patent publication, is difficult to put into practical use.

DISCLOSURE OF THE INVENTION

In view of the above points, it is a first object of the present invention to reduce the time required to assemble an intake duct.

In view of the above points, it is a second object of the present invention to effectively utilize a space in an engine compartment while an increase in the size of the front end panel is prevented.

In order to accomplish the above first object, one embodiment of the present invention comprises: a panel body section, the cross section of which is formed into a shape, for example a substantial C-shape, so that the vehicle rear side of the cross section can be open; a duct member for closing the opening side of the panel body section; and an intake duct composed when the opening side of the panel body section is closed by the duct member.

Due to the foregoing, when the front end panel is incorporated into a vehicle under the condition that the duct member is assembled onto the front panel, assembling the intake duct is completed. Accordingly, it is possible to reduce the time required to assemble the intake duct. Therefore, the manufacturing cost of the vehicle can be decreased.

In order to accomplish the above second object, another embodiment of the present invention comprises: a first opening section for communicating the inside of the duct with the outside, provided at a position corresponding to the intake duct in the panel body section on the vehicle front side; and a second opening section for communicating the inside of the duct with the outside, provided at a position corresponding to the intake duct in the panel body section on the vehicle rear side, wherein the first opening section and the second opening section are shifted from each other when viewed from the vehicle front side.

Due to the above structure, after a current of air has flowed into the intake duct, it flows in the intake duct in a crank-shape and flows out from the intake duct. Therefore, foreign objects such as rain water and snow, which have entered the intake duct together with air, cannot flow with the air. As a result, the foreign objects such as rain water and snow remain in the intake duct.

Accordingly, it is unnecessary to arrange an air rough mesh filter, for removing large foreign objects such as rain water and snow, in the air path. Therefore, it is unnecessary to increase the volume of the intake duct. Consequently, when the intake duct capable of removing foreign objects is formed on the front end panel while an increase in the size of the front end panel is being prevented, it is possible to effectively utilize a space in the engine compartment.

The present invention will be more fully understood from the accompanying drawings and the description of the preferred embodiment of the present invention.

PREFERRED EMBODIMENTS FOR CARRYING OUT THE INVENTION

Figure 1:
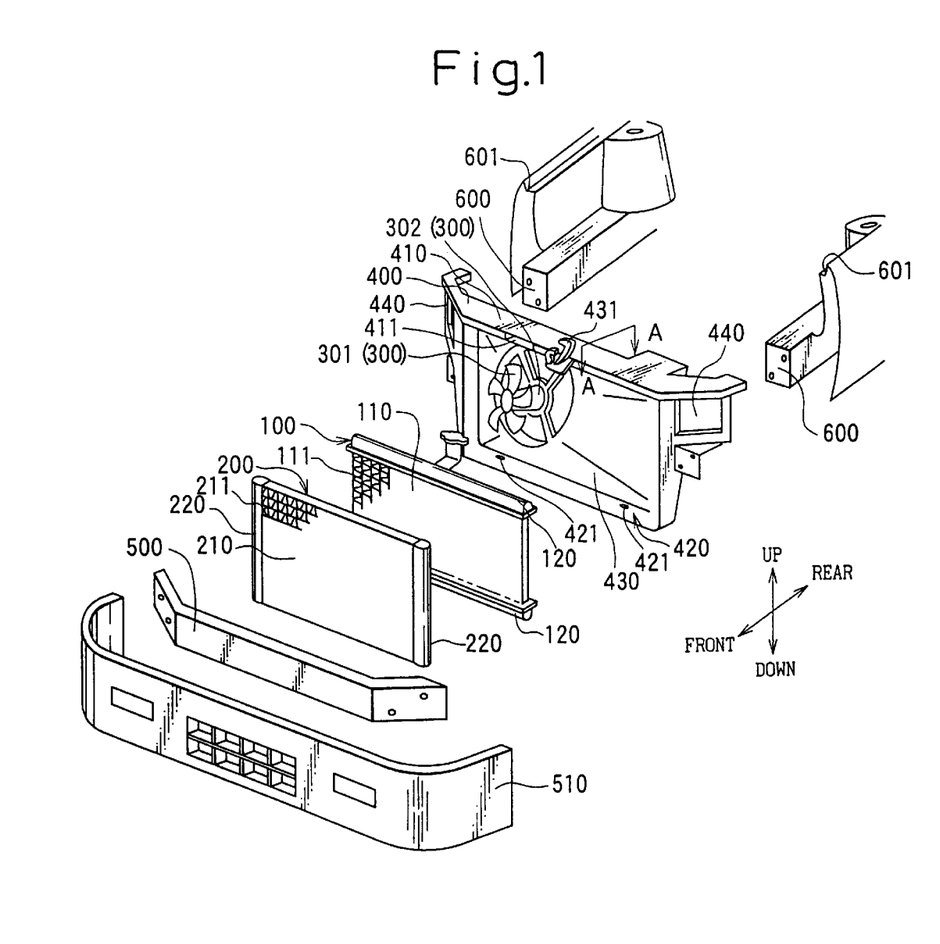
FIG. 1 is an exploded perspective view showing a front end section of a vehicle into which a front end panel of one embodiment of the present invention is incorporated.

FIG. 1 is an exploded perspective view of a vehicle front end section in which an intake duct structure of the embodiment is utilized. Reference numeral 100 is a radiator, reference numeral 200 is a condenser, and reference numeral 300 is a fan device composed of a fan 301 and an electric motor 302.

In this connection, the radiator 100 is a well known multi-flow type heat exchanger including: a radiator core 110 composed of a plurality of radiator tubes 111 in which coolant flows; and radiator tanks 120 arranged on both end sides of the radiator tubes 111 in the longitudinal direction, the radiator tanks 120 communicating with the radiator tubes 111.

The condenser 200 is a well known multi-flow type heat exchanger, which is composed in the same manner as that of the radiator 200, including: a condenser core 210 composed of a plurality of condenser tubes 211 in which refrigerant flows; and condenser tanks 220 arranged on both end sides of the condenser tubes 211 in the longitudinal direction, the condenser tanks 220 communicating with the condenser tubes 211.

Reference numeral 400 is a front end panel (referred to as a panel hereinafter) made of resin to which vehicle front end parts such as a radiator 100, condenser 200 and fan device 300 are incorporated and fixed. This panel 400 includes: an upper beam member 410 located on the upper side and extended in the horizontal direction; a lower beam member 420 located on the lower side and extended in the horizontal direction; and a vertical wall section 430 having faces in the vertical direction, which are substantially parallel with each other, connected with both the beam members 410, 420, supporting the fan device 300 (electric motor 302). In this connection, the vertical wall section 430 is also used as a shroud for preventing the fan device 300 from sucking air from the rear side of the air current of the radiator 100.

In the upper beam 410, there is provided a hood lock 431 for fixing the bonnet (engine hood). Also, in the upper beam 410, there is provided a rectangular frame-shaped light attaching section 440 to which a headlight (not shown) is attached.

In both beam members 410, 420, there are provided hole sections (fixing sections) 421 for fixing the radiator 100. The radiator 100 is fixed (incorporated) to the panel 400 when pin sections (not shown) formed in the radiator 100 are inserted into the hole sections 421 for fixing which are formed in both beam members 410, 420. In this connection, the condenser 200 is fixed to the radiator 100 by a fastening means such as bolts via stays (not shown).

Reference numeral 500 is a bumper reinforce (referred to as a bumper hereinafter) made of metal which forms a buffer member on the front side of a vehicle. Reference numeral 510 is a bumper cover made of resin which covers the bumper 500. The panel 400 is fixed to the side bodies 600, 601 of the vehicle with a fastening means such as bolts.

Figure 2:
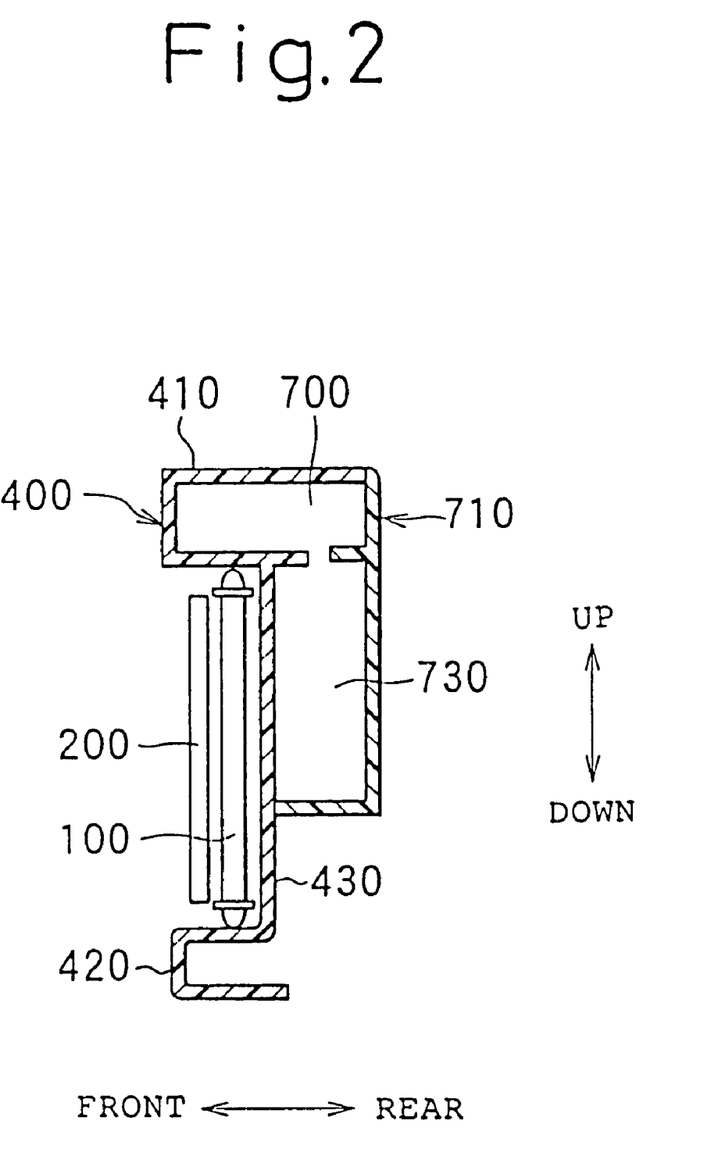
FIG. 2 is a cross-sectional view taken on line A—A in FIG. 1.

In this connection, the cross sections of the upper beam member 410 and the lower beam member 420 are formed into a shape, for example a substantial C-shape, in such a manner that the rear side of the vehicle is open as shown in FIG. 2. When the opening side of the upper beam member 410 is closed with the duct member 710 made of resin, the intake duct (intake path) 700 for guiding air (intake air) into an engine for vehicle running (not shown) is provided.

Figure 3:
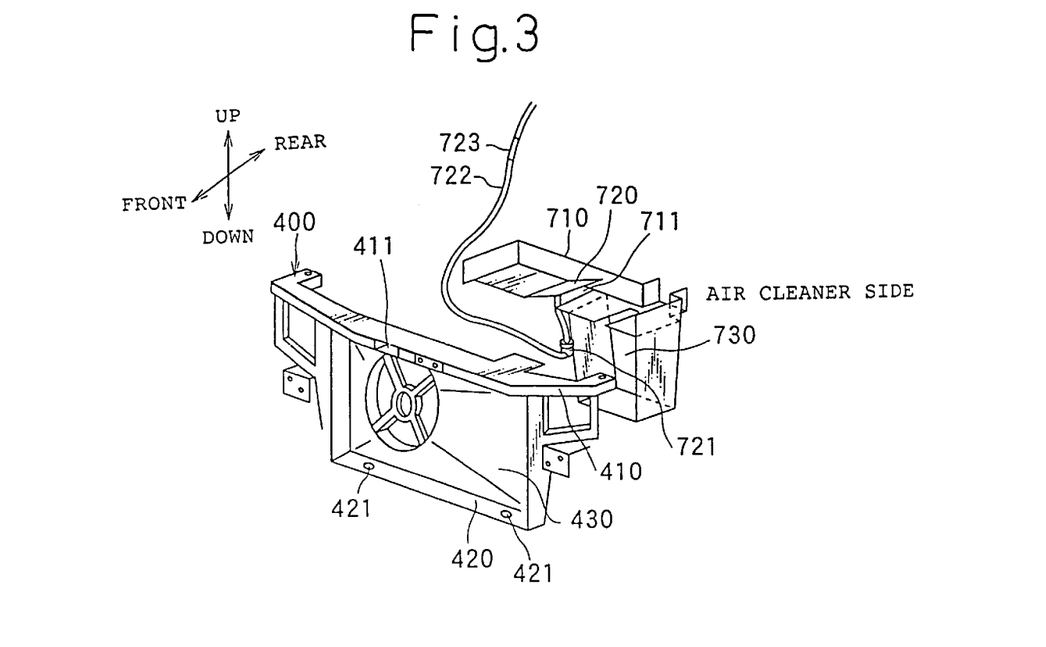
FIG. 3 is an exploded perspective view of a panel and duct member.
Figure 4:
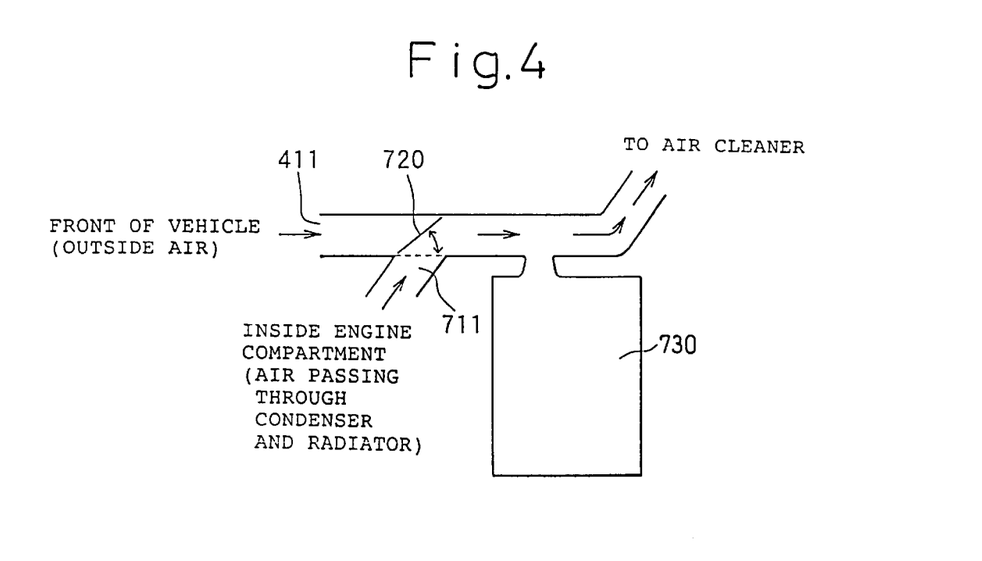
FIG. 4 is a view showing a model of an intake duct including a resonator.

As shown in FIG. 3, on the front side of the vehicle of the upper beam member 410, there is provided an outside air introducing hole 411 for introducing outside air into the intake duct 700. On the other hand, in the duct member 710, there is provided an inside air introducing hole 711 for introducing inside air of the engine compartment into the intake duct 700. As shown in FIGS. 3 and 4, in the duct member 710, there is provided an intake air adjusting door (intake air adjusting means) 720 for adjusting a volume of outside air introduced from the outside air introducing port 411 and a volume of inside air introduced from the inside air introducing port 711.

In this connection, reference numeral 721 is an actuator for driving the intake air adjusting door 720 when suction pressure of the engine is being used as a drive source, reference numeral 722 is a pressure introducing pipe for supplying pressure to the actuator 721, and reference numeral 723 is an electromagnetic valve, which is arranged in the pressure introducing pipe 722, for controlling suction pressure supplied to the actuator 721. This intake air adjusting door 720 is operated as follows. When the coolant temperature of the engine is not higher than a predetermined temperature (50° C. in this embodiment), the intake air adjusting door 720 controls a volume of outside air to be approximately 0 so that only inside air can be supplied to the engine. On the other hand, when the coolant temperature of the engine is higher than the predetermined temperature, the intake air adjusting door 720 controls a volume of inside air to be approximately 0 so that only outside air can be supplied to the engine.

As shown in FIG. 2, a portion of the duct member 710 on the downstream side (on the air cleaner side or the intake manifold side) with respect to the intake air adjusting door 720 extends downward from the intake duct (intake path) 700, so that this portion of the duct member 710 composes a resonator 730 for reducing a sound of intake air together with the vertical wall section 430.

In this embodiment, a portion of the duct member 710 composing the intake duct (intake path) 700 is made to adhere to the upper beam member 710 by an adhesion means such as welding, and a portion of the duct member 710 composing the resonator 730 is made to adhere to the vertical wall section 430 by an adhesion means such as welding.

Next, the characteristic of this embodiment will be described as follows.

In this embodiment, since the intake duct (intake path) 700 is composed of the upper beam member 410, the cross section of which is a shape, for example a substantial C-shape, so that the vehicle rear side of the cross section is open, assembling the intake duct 700 can be completed when the panel 400 is incorporated into a vehicle under the condition that the duct member 710 is attached to the panel 400. Accordingly, the time necessary for assembling the intake duct 700 can be greatly decreased. Accordingly, the manufacturing cost of the vehicle can be reduced.

In this embodiment, simultaneously when assembling the intake duct 700 is completed, assembling the resonator 730 is completed. Therefore, the time necessary for assembling the intake duct 700 including the resonator 730 can be decreased. Accordingly, the manufacturing cost of the vehicle can be further reduced.

When the temperature of coolant of the engine is not higher than a predetermined temperature, air inside the engine compartment is introduced into the intake duct 700. Therefore, even in winter when the temperature of coolant of the engine is low when the engine is started, that is, in the case of cold start, intake air of a relatively high temperature is sent to the engine. Therefore, the warm-up time of the engine can be shortened, and the fuel consumption can be enhanced.

As described above, according to the present invention, while the warm-up time of the engine is being shortened and the fuel consumption is being enhanced, the manufacturing cost of the vehicle can be reduced.

In the above embodiment, the panel 400 and the duct member 710 are made of resin, however, it should be understood that material of the panel 400 and the duct member 710 is not limited to resin, but other materials such as metal may be used.

In the above embodiment, the intake air adjusting door 720 is provided in the duct member 710, however, the intake air adjusting door 720 may be provided in the upper beam member 410.

In the above embodiment, the intake air adjusting door 720 is operated according to the temperature of coolant of the engine. However, the intake air adjusting door 720 may be operated according to the temperature of outside air or the temperature of the engine itself.

In the above embodiment, the duct member 71 and the resonator 730 are formed differently from each other, however, both of them may be formed integrally with each other.

Figure 5:
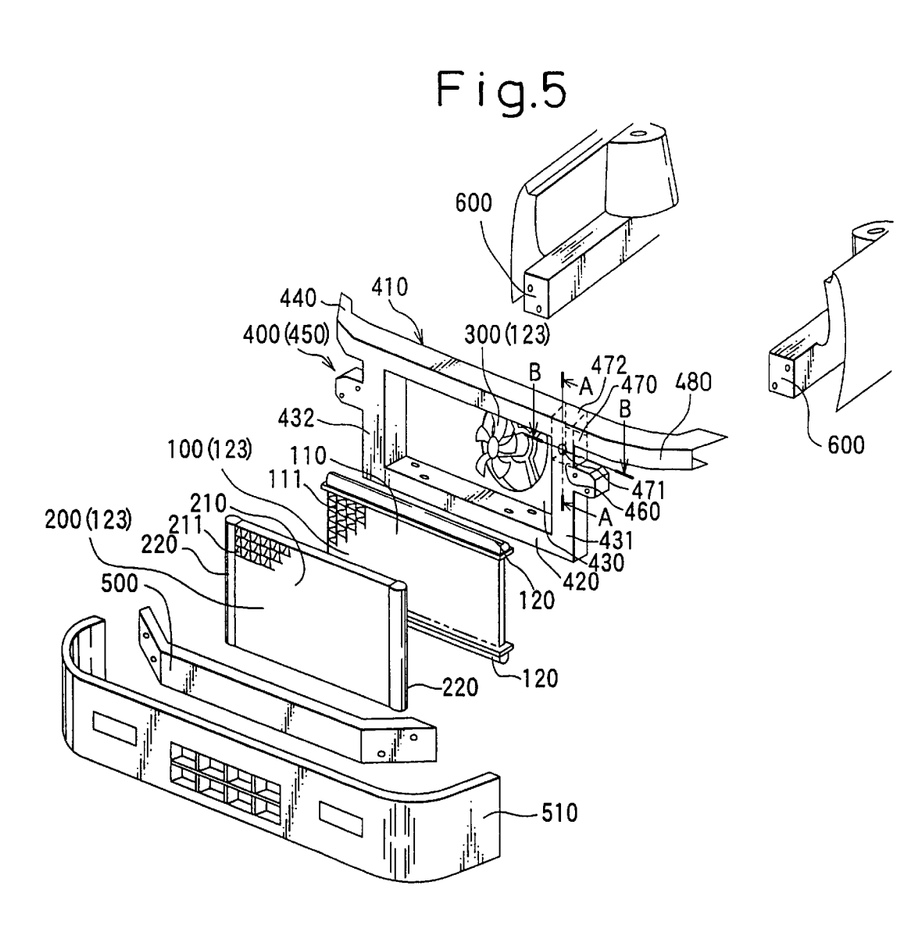
FIG. 5 is an exploded perspective view showing a front end section of a vehicle into which a front end panel of another embodiment of the present invention is incorporated.

FIG. 5 is an exploded perspective view of a vehicle front end section in which a front end panel of another embodiment of the present invention is utilized. Reference numeral 100 is a radiator, reference numeral 200 is a condenser, and reference numeral 300 is a fan device composed of a fan 301 and an electric motor 302.

Reference numeral 400 is a front end panel (referred to as a panel hereinafter) made of resin to which vehicle front end parts 123 such as a radiator 100, condenser 200 and fan device 300 are incorporated and fixed.

Panel 400 includes: an upper beam member 410 located on the upper side and extended in the vehicle width direction (the horizontal direction); a lower beam member 420 located on the lower side and extended in the vehicle width direction; a first pillar section 431 and a second pillar section 432 extended in the vertical direction and connecting both the beam members 410, 420 with each other; a vertical wall section 430 connecting both the beam members 410, 420 with each other and also connecting both the pillar sections 431, 432 with each other so that the vertical wall section 430 can extend in the vertical and the horizontal direction; and a bracket section 480 extending from the upper end side of the first pillar section 431 and the second pillar section 432 to the side of the vehicle, the bracket section 480 fixing the panel 400 to the vehicle body 600, wherein these components are made of resin and integrally molded into one body.

In this connection, the vertical wall section 430 supports the electric type fan device 300 for sending cooling air to the radiator 100 and condenser 200. The vertical wall section 430 is also used as a shroud for preventing the fan device 300 from sucking air from the rear side of the air current of the radiator 100.

The first pillar section 431, the second pillar section 432 and the vertical wall section 430 connect both the beam members 410, 420 with each other. Therefore, they are generally called connecting members. The rectangular frame body composed of both the beam members 410, 420 and also composed of the first pillar section 431 and the second pillar section 432 including the bracket section 480 is referred to as a panel body section 450.

In this connection, the cross sections of both the beam members 410, 420 and the first pillar section 431 and the second pillar section 432 are formed into a shape, for example a substantial C-shape, so that the vehicle rear sides of the cross sections are open. Inside these members 410, 420, 431, 432, there are integrally provided a plurality of rib walls 460 for enhancing the torsional rigidity of both the beam members 410, 420 and the first pillar section 431 and the second pillar section 432 in such a manner that these rib walls 460 partition the substantially C-shaped groove into a plurality of spaces.

Figure 6:
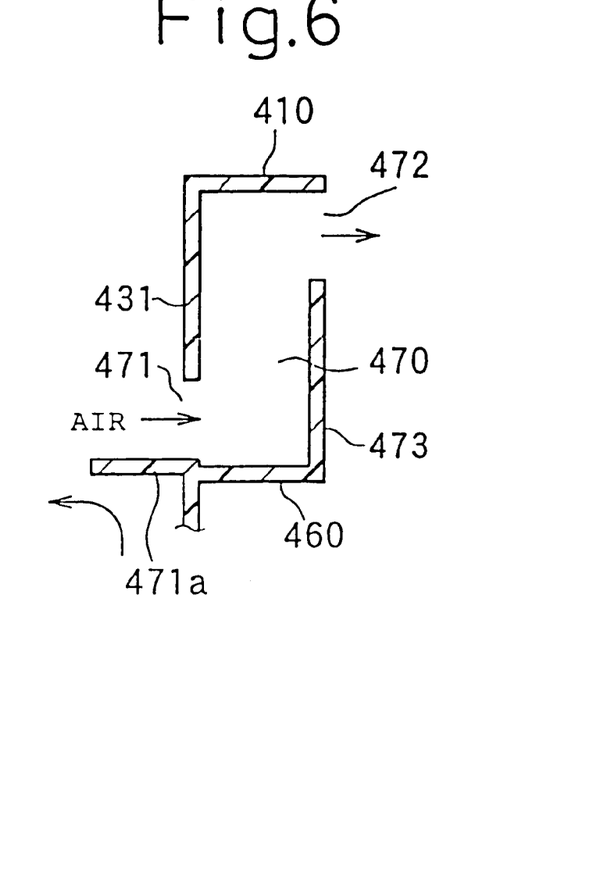
FIG. 6 is a cross-sectional view taken on line A—A in FIG. 5.

As shown in FIG. 6, in the first pillar section 431 of the panel body 450, there is formed a box-shaped space (intake duct) 470 which is substantially closed. In a portion of the first pillar section 431 corresponding to the space 470 on the front side of the vehicle, there is provided an intake port (first opening section) 471 for communicating the inside with the outside of the space 470 so that air can be introduced into the space (intake duct) 470.

On the other hand, in a portion of the first pillar section 431 corresponding to the space 470 on the rear side of the vehicle, there is provided a discharge port (second opening section) 472 for communicating the inside with the outside of the space 470 so that air in the space 470 can be discharged to the intake side of an engine (not shown) via an intake duct (not shown). In this case, the intake port 471 and the discharge port 472 are shifted in the vertical direction when they are viewed from the front of the vehicle.

On the lower side of the intake port 471, there is integrally provided a protruding wall 471a which protrudes to the front side of the vehicle. This protruding wall 471a is formed into a semi-cylindrical shape which agrees with the outer edge shape of the intake port 471.

Figure 7:
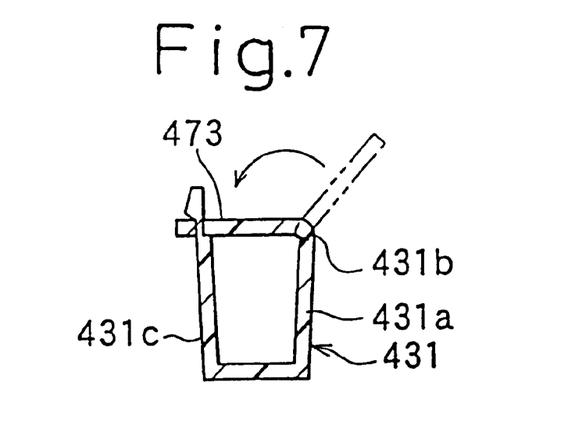
FIG. 7 is a cross-sectional view taken on line B—B in FIG. 5.

In this connection, the space 470 is composed of a cover section 473 for closing the opening section, which is open to the rear side of the vehicle, and a rib wall 460. As shown in FIG. 7, the cover section 473 is connected with the side wall section 431a via the hinge section (thin section) 431b, the wall thickness of which is small, capable of oscillating with respect to the side wall section 431a of the first pillar section 431.

Immediately after the completion of resin molding (before the radiator 100 and others are incorporated), as shown in FIG. 7 by a two-dotted chain line, the cover section 473 is open so that it can be linearly continued to the side wall section 431a. When the cover section 473 is bent round the hinge section 431b so that the space 470 can be closed after the radiator 100 and the condenser 200 have been incorporated, the substantially closed space 470 can be composed. In this connection, the cover section 473 is fixed to the side wall section 431c by an engaging means such as a pawn.

In FIG. 5, reference numeral 500 is a bumper reinforce (referred to as a bumper hereinafter) which forms a buffer member arranged on the front side of a vehicle. Reference numeral 510 is a bumper cover made of resin which covers the bumper 500. The bumper 500 and the panel 400 are fixed to the body (side member) 600 on the side of the vehicle by a fastening means such as bolts.

Next, the characteristic of this embodiment will be described below.

The intake port 471 formed in the panel body section 450 (first pillar section 431) and the discharge port 472 are shifted from each other when they are viewed from the front side of the vehicle. Therefore, a current of air, which has flowed into the space 470 from the intake port 471, is bent (turned) in a crank-shape in the space 470 and then discharged from the discharge port 472 to the outside of the space 470. Since foreign objects such as rain water and snow, which have entered the space 470 from the intake port 471 together with air, cannot flow together with the current of air flowing in the space 470, large foreign objects such as rain water and snow remain in the space 470, so that the foreign objects can be prevented from entering the engine via the intake duct.

Accordingly, it is unnecessary to arrange an air rough mesh filter, for removing large foreign objects such as rain water and snow, in the air path. Therefore, it is unnecessary to increase a volume of the space 470. Consequently, while an increase in the size of the panel 400 is prevented, the space 470 for removing foreign objects is formed on the panel 400. Due to the foregoing, it is possible to effectively utilize the space in the engine room.

Since the intake port 471 is open to the front side of the vehicle, it is possible to take in new air at low temperature. Therefore, the suction efficiency of the engine can be enhanced.

In this connection, when a vehicle is running in a pool or on a bad road, water splashes from the lower side to the upper side. Accordingly, there is a high possibility that this splash water will enter the space 470 from the intake port 471.

In order to prevent the above problem, in this embodiment, a protruding wall 471a is formed on the lower side of the intake port 471. This protruding wall 471a functions as a sluice. Therefore, it is possible to prevent the splashing water from entering the space 470.

In this connection, as can be seen in the above explanations, foreign objects remain in the space 470. Although not shown in the drawing, there is provided a drain port for discharging the foreign objects on the lower side of the space 470 in this embodiment.

In this embodiment, the intake port 471 and the discharge port 472 are arranged shifted from each other when they are viewed from the front of the vehicle. Therefore, the degree of freedom can be enhanced when the arrangement of the intake duct is designed.

Figure 8:
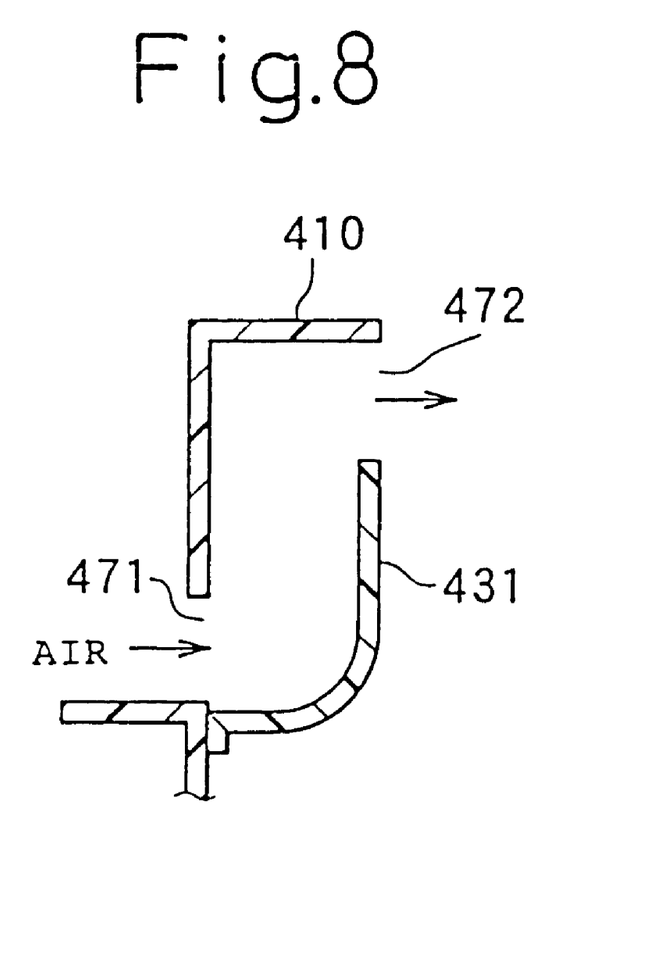
FIG. 8 is a cross-sectional view corresponding to the cross-sectional view taken on line B—B in FIG. 5 in the panel of another embodiment of the present invention.

In the above embodiment, the cover section 473 is molded integrally with the first pillar section 431 (side wall section 431a). However, as shown in FIG. 8, after the cover section 473 has been molded separately from the first pillar section 431 (panel body 450), the cover section 473 may be incorporated into the first pillar section 431 (panel body 450) by a joining means such as welding or screws.

Figure 9:
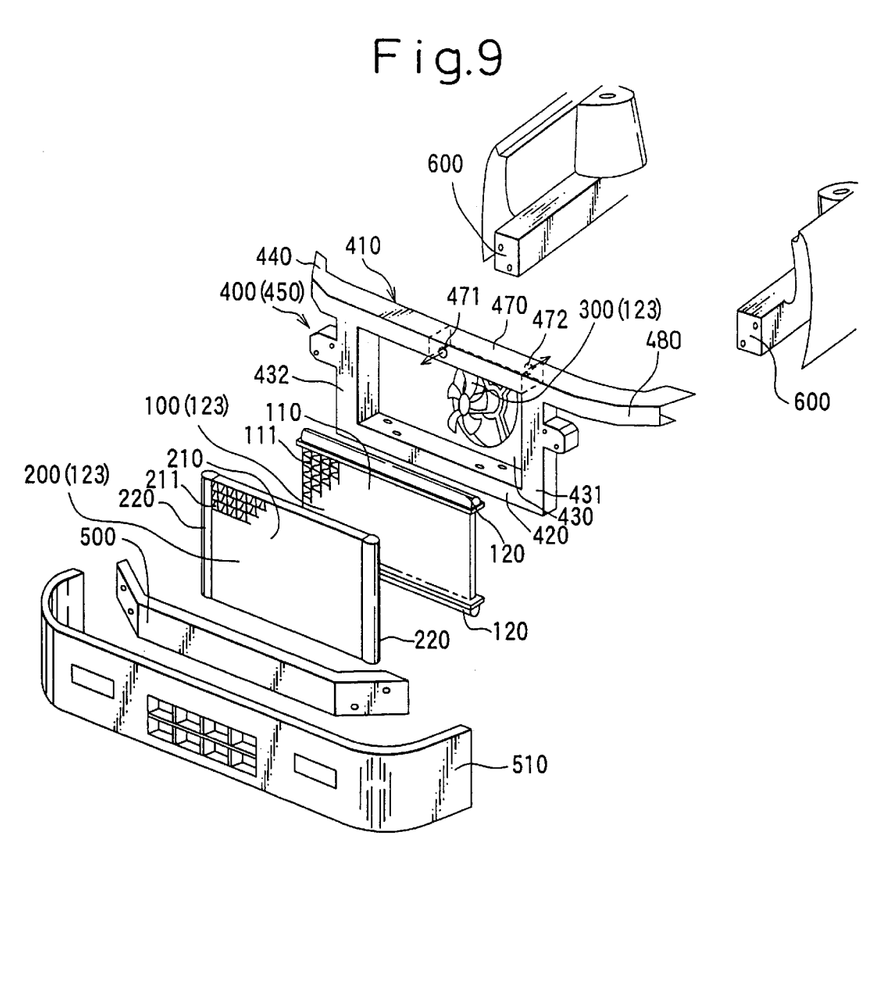
FIG. 9 is a perspective view of a panel of a variation of the present invention.

In the above embodiment, the space 470 is formed in the first pillar section 431, however, the present invention is not limited to the above specific embodiment. The space 470 may be formed anywhere in the panel body 450 (panel 400). For example, as shown in FIG. 9, the space 470 is formed in the upper beam member 410, and the intake port 471 and the discharge port 472 may be arranged being shifted from each other when they are viewed in the traverse direction (width direction) when they are viewed from the front side of the vehicle.

In the above embodiment, the cover section 473 is incorporated by the engaging means, however, the cover section 473 may be incorporated by a connecting means such as welding or screws.

The panel 400 and the space 470 may be simultaneously formed by means of blow molding.

In the above embodiment, the intake port 471 and the discharge port 472 are arranged shifted from each other when they are viewed from the front of the vehicle so that they cannot overlap each other. However, it may possible to adopt an arrangement in which the intake port 471 and the discharge port 472 are arranged being shifted from each other in such a manner that a portion of the intake port 471 and a portion of the discharge port 472 overlap each other. In this connection, the meaning of the phrase of "when they are viewed from the front of the vehicle", which is described in this specification, includes the meaning of the phrase of "when they are viewed from the direction substantially perpendicular to the opening face of the intake port 471".

It is possible to adopt an arrangement in which the electronic control unit (controller) for controlling electric equipment such as a fan device 300 and headlight is assembled onto the panel 400, so that the controller can be cooled by air flowing in the space 470.

In this connection, the specific embodiments of the present invention are explained in detail in this specification. However, it should be noted that changes may be made by one skilled in the art without departing from the spirit and scope of the invention.

What is claimed is:

1. A front end panel which is mounted in a front end section of a vehicle for attaching a radiator comprising:
    a panel body section, having an upper beam member, a lower beam member and a vertical wall section, which are formed into a shape having a rear side and a front side, the rear side of the panel body section is open;
    a duct member for closing the rear side of the panel body section;
    an intake duct defined when the rear side of the panel body section is closed by the duct member;
    a first opening section for communicating the inside of the intake duct with outside air provided at a position corresponding to the front side of the panel body section, the first opening section being in communication with air outside of a vehicle engine compartment and air inside of the vehicle engine compartment; and
    a second opening section for communicating the inside of the intake duct with the outside provided at a position corresponding to the rear side of the panel body section, the second opening section being in direct communication with an intake of an engine of the vehicle;
    wherein:
    the first opening section and the second opening section are arranged shifted from each other when a view is taken from the vehicle front end section; and
    air introduced into the intake duct from the first opening section flows out of the intake duct through the second opening section.

2. The front end panel according to claim 1, further comprising a protruding wall protruding to the front side of a vehicle, wherein the protruding wall is arranged on the lower side of the first opening section.

3. The front end panel according to claim 1, further comprising: an upper beam member located on the upper side extending in the horizontal direction; and a lower beam member located on the lower side extending in the horizontal direction, wherein the intake duct is composed of the upper beam member and the duct member.

4. The front end panel according to claim 3, further comprising a vertical wall section for connecting both the beam members, having faces parallel to each other in the vertical direction, wherein a resonator to reduce an intake air sound is composed of the vertical wall section and the duct member.

5. The front end panel according to claim 1, further comprising: an inside air introducing port for introducing air inside an engine compartment into the intake duct, formed in the panel body section or the duct member; and an intake air adjusting means for adjusting a volume of inside air introduced from the inside air intake port and also adjusting a volume of outside air introduced from the first opening section, the intake air adjusting means being composed in the panel body section or the duct member.

6. The front end panel according to claim 1, wherein the panel body section and the duct member are made of resin.

7. The front end panel according to claim 6, wherein the panel body section and the duct member are integrally molded.

8. The front end panel according to claim 6, wherein the duct member and the panel body section are molded separately from each other and incorporated into the panel body section.

9. The front end panel according to claim 1, wherein the intake duct defines a labyrinthine flow path.

10. The front end panel according to claim 1, wherein air adapted to flow around the radiator flows through the intake duct.

11. The front end panel according to claim 1, wherein the first opening section and the second opening section are arranged shifted in a transverse direction from each other when viewed from the vehicle front.

12. The front end panel according to claim 1, wherein the first opening section and the second opening section are arranged shifted in a vertical direction from each other when viewed from the vehicle front.

13. The front panel according to claim 12, wherein the second opening section is located above the first opening section.

* * * * *

UNITED STATES PATENT AND TRADEMARK OFFICE
CERTIFICATE OF CORRECTION

PATENT NO. : 6,578,650 B2
DATED : June 17, 2003
INVENTOR(S) : Ikuo Ozawa et al.

It is certified that error appears in the above-identified patent and that said Letters Patent is hereby corrected as shown below:

Column 10,
Line 12, after "front" insert -- end --

Signed and Sealed this

Eleventh Day of November, 2003

JAMES E. ROGAN
*Director of the United States Patent and Trademark Office*